(12) United States Patent
Ye et al.

(10) Patent No.: US 11,601,196 B2
(45) Date of Patent: *Mar. 7, 2023

(54) REAL-TIME HEALTH MONITORING IN AN ALL-PHOTONICS NETWORK

(71) Applicant: DELL PRODUCTS L.P., Round Rock, TX (US)

(72) Inventors: Qing Ye, Hopkinton, MA (US); Rowland Shaw, Chester, NH (US); Said Tabet, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,864

(22) Filed: Sep. 30, 2021

(65) Prior Publication Data

US 2022/0345215 A1 Oct. 27, 2022

Related U.S. Application Data

(63) Continuation-in-part of application No. 17/241,951, filed on Apr. 27, 2021, now Pat. No. 11,388,493.

(51) Int. Cl.
*H04B 10/071* (2013.01)
*H04B 10/67* (2013.01)
*H04B 10/079* (2013.01)

(52) U.S. Cl.
CPC ....... *H04B 10/071* (2013.01); *H04B 10/0791* (2013.01); *H04B 10/0795* (2013.01); *H04B 10/67* (2013.01)

(58) Field of Classification Search
CPC .................................................. H04B 10/071
See application file for complete search history.

(56) References Cited

U.S. PATENT DOCUMENTS

| | | | |
|---|---|---|---|
| 8,948,589 B2 | 2/2015 | Smith et al. | |
| 9,673,897 B2 | 6/2017 | Prause | |
| 10,783,472 B2 | 9/2020 | Carpenter et al. | |
| 11,323,178 B1 * | 5/2022 | Dudley | H04B 10/07953 |
| 2017/0244518 A1 | 8/2017 | Singh et al. | |
| 2020/0028585 A1 * | 1/2020 | Abdullah | H04L 7/0075 |

(Continued)

OTHER PUBLICATIONS

M. Bland, "Mean and Standard Deviation", Aug. 2006, downloaded from https://www-users.york.ac.uk/~mb55/msc/applbio/week3/sd_text.pdf. (Year: 2006).*

*Primary Examiner* — Shi K Li
(74) *Attorney, Agent, or Firm* — Larson Newman, LLP

(57) ABSTRACT

An information handling system includes a plurality of network nodes and a processor. The network nodes each include an optical link and a reflectometry analyzer. The reflection analyzers provide reflectometry results that each provide a characterization of physical properties of the associated optical link. The processor receives the reflectometry results, and, for each optical link, analyzes the reflectometry results to determine a fingerprint of the physical properties of the associated optical link. The processor further determines a status for each of the optical links based upon the associated fingerprints, and displays a map of the information handling system including each network node and the associated optical link, wherein the map provides an indication of the status for each of the optical links.

19 Claims, 9 Drawing Sheets

(56) References Cited

U.S. PATENT DOCUMENTS

2020/0092026 A1* 3/2020 Birk .................... H04L 45/08
2020/0350986 A1* 11/2020 Ahadian .......... H04B 10/07955
2022/0007093 A1* 1/2022 MacKay ............ H04B 10/0795

* cited by examiner

REAL-TIME HEALTH MONITORING IN AN ALL-PHOTONICS NETWORK

CROSS-REFERENCE TO RELATED APPLICATION

This application is a continuation-in-part of U.S. patent application Ser. No. 17/241,951 entitled "Secure and Attested All-Photonics Network," filed on Apr. 27, 2021, the disclosure of which is hereby expressly incorporated by reference in its entirety.

Related subject matter is contained in co-pending U.S. patent application Ser. No. 17/490,506 entitled "INFRASTRUCTURE INTEGRITY AND ATTESTATION OF AN ALL-PHOTONICS NETWORK," filed Sep. 30, 2022, the disclosure of which is hereby incorporated by reference.

Related subject matter is contained in co-pending U.S. patent application Ser. No. 17/490,550 entitled "IDENTIFYING LINK FINGERPRINT ANOMALIES IN REAL-TIME IN AN ALL-PHOTONICS NETWORK," filed Sep. 30, 2022, the disclosure of which is hereby incorporated by reference.

Related subject matter is contained in co-pending U.S. patent application Ser. No. 17/490,617 entitled "IDENTIFYING OPTIMAL PATHS IN AN ALL-PHOTONICS NETWORK," filed Sep. 30, 2022, the disclosure of which is hereby incorporated by reference.

Related subject matter is contained in co-pending U.S. patent application Ser. No. 17/490,706 entitled "PATH MANAGEMENT FOR TIERED SERVICE LEVEL AGREEMENTS IN AN ALL PHOTONICS NETWORK," filed Sep. 30, 2022, the disclosure of which is hereby incorporated by reference.

FIELD OF THE DISCLOSURE

This disclosure generally relates information handling systems, and more particularly relates to providing real-time health monitoring in an all-photonics network.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a plurality of network nodes and a processor. The network nodes may each include an optical link and a reflectometry analyzer. The reflection analyzers may provide reflectometry results that each provide a characterization of physical properties of the associated optical link. The processor may receive the reflectometry results, and, for each optical link, analyze the reflectometry results to determine a fingerprint of the physical properties of the associated optical link. The processor may further determine a status for each of the optical links based upon the associated fingerprints, and display a map of the information handling system including each network node and the associated optical link, wherein the map provides an indication of the status for each of the optical links.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
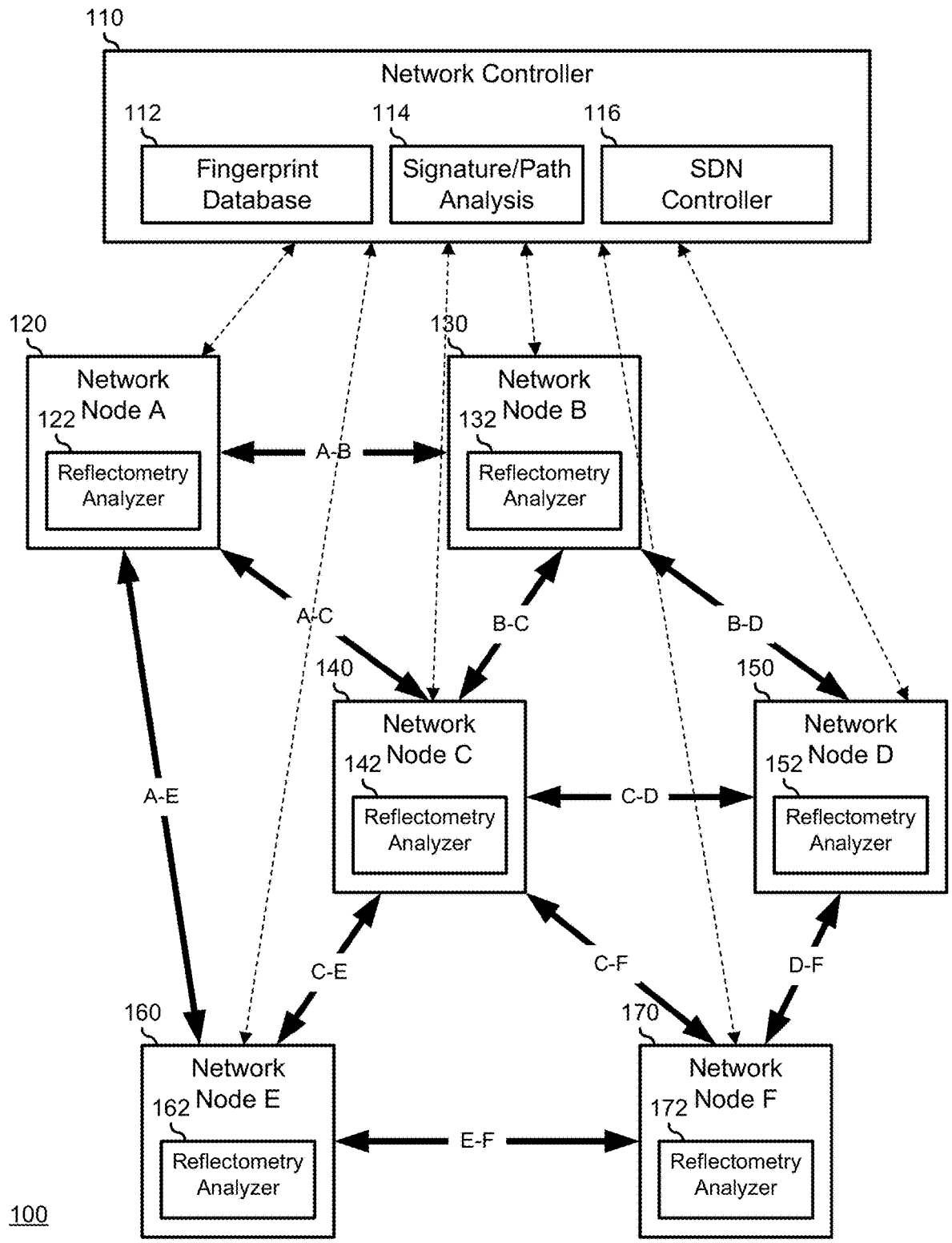
FIGS. 1-3 illustrate an all-photonics network according to an embodiment of the current disclosure.

FIG. 1 illustrates an all-photonics network 100 including a network controller 110 and network nodes 120, 130, 140, 150, 160, and 170. Network controller 110 includes a fingerprint database 112, a signature and path analysis module 114, and a Software Defined Network (SDN) controller 116. Nodes 120, 130, 140, 150, 160, and 170 each include respective reflectometry analyzers 122, 132, 142, 152, 162, and 172. All-photonics network 100 is characterized by the fact that the links between nodes 120, 130, 140, 150, 160, and 170 are all optical-based network links, such as where communications between the nodes is carried by fiber-optic links.

All-photonics network 100 may represent a regional network where the links between nodes 120, 130, 140, 150, 160, and 170 are single-mode fiber optic links that may include embedded repeaters as needed or desired, or may represent a more local network where the links between the nodes are multi-mode fiber optic links. One or more of nodes 120, 130, 140, 150, 160, and 170 may represent network routing and switching devices, where the data transmitted over all-photonics network 100 is received from and sent to other devices that utilize the data. For example, the data transmitted over all-photonics network 100 may represent data transmitted between different datacenters. One or more of nodes 120, 130, 140, 150, 160, and 170 may also represent data processing systems or have dedicated data processing capacities as needed or desired.

The data transmitted via all-photonics network 100 may be understood to be directed from a source node to a target node, and may, under various routing protocols, such as a Border Gateway Protocol (BGP), an Open Shortest Path First (OSPF) protocol, an Intermediate System to Intermediate System (IS-IS) protocol, or the like, be directed via various routing paths and through different nodes in the all-photonics network, based upon the traffic volume, or other conditions on the all-photonics network, as needed or desired. As such, SDN controller 116 operates to manage the switching and routing functions of nodes 120, 130, 140, 150, 160, and 170 to ensure that all-photonics network 100 provides reliable data communication between the nodes. For example, SDN controller 116 and nodes 120, 130, 140, 150, 160, and 170 may implement an OpenFlow architecture to permit the remote management of the switching and routing functions of the nodes by the SDN controller.

Reflectometry analyzers 122, 132, 142, 152, 162, and 172 represent capabilities associated with the links between nodes 120, 130, 140, 150, 160, and 170. In particular, reflectometry analyzers 122, 132, 142, 152, 162, and 172 operate to send test signals, modulated light pulses, down the links, to receive backscattered light from the links, and to analyze the backscattered light to determine the physical characteristics of the links. In a particular embodiment, for example where all-photonics network 100 represents a widely dispersed network that utilizes single mode optical fibers, reflectometry analyzers 122, 132, 142, 152, 162, and 172 may represent optical time domain reflectometry (OTDR) capabilities that analyze the attenuation of the backscattered light from the links to determine the spatial location of discontinuities in the optical fibers.

In another embodiment, for example where all-photonics network 100 represents a more closely spaced network that utilizes multi-mode optical fibers, reflectometry analyzers 122, 132, 142, 152, 162, and 172 may represent optical frequency domain reflectometry (OFDR) capabilities that provide a swept frequency test signal to determine the spatial arrangement of strain, temperature, and other characteristics of the associated links. In yet another embodiment, reflectometry analyzers 122, 132, 142, 152, 162, and 172 may represent other types of capabilities within respective nodes 120, 130, 140, 150, 160, and 170 to collect reflected, refracted, scattered or other backward propagated light that functions to characterize the optical links from connector surfaces, splices, and other fiber impurities along the optical links, as needed or desired. Further, it will be understood that reflectometry analyzers 122, 132, 142, 152, 162, and 172 may represent separate capabilities within respective nodes 120, 130, 140, 150, 160, and 170, or may be integrated with the respective nodes, as needed or desired. The details of reflectometry and of OFDR and OTDR capabilities is known in the art, and will not be further described herein except as needed to illustrate the current embodiments.

The inventors of the current disclosure have understood that reflectometry analysis capabilities like reflectometry analyzers 122, 132, 142, 152, 162, and 172 are typically utilized in all-photonics networks when a new fiber optic cable is installed to characterize the fiber optic cable. If issues arise with the data transmission over that fiber optic cable, then the reflectometry analysis will be performed again. Then the newly determined characteristics for the particular fiber optic cable can be compared with the original characteristics to determine the nature and location of the issues in the fiber optic cable. It has been further understood that, for any particular fiber optic cable, the results of a reflectometry analysis will be unique to that particular fiber optic cable, and that no other fiber optic cable will display an identical reflectometry analysis result. For example, no two fiber optic cables will have splices, connectors, and imperfections at the exact spatial locations within the fiber optic cables as each other. As such, each fiber optic cable will demonstrate a unique reflectometry analysis result, like unto a fingerprint. Hence, each fiber optic cable will hereinafter be understood to have a unique reflectometry analysis fingerprint.

In a particular embodiment, reflectometry analyzers 122, 132, 142, 152, 162, and 172 operate to continuously monitor the associated optical links to generate a real time fingerprint for each optical link. For example, where a particular optical link represents a single mode fiber optic cable, the associated reflectometry analyzer 122, 132, 142, 152, 162, or 172 may operate to halt data transmission over that optical link for a short duration, and generate a reflectometry analysis fingerprint for that optical link, and then resume data transmission on that optical link. In another example, a sensing signal provided by reflectometry analyzers 122, 132, 142, 152, 162, and 172 may share optical links such that no interruption of the data transmission is necessary. For example, reflectometry analyzers 122, 132, 142, 152, 162, and 172 may provide pulses on a continuous basis by using a wavelength division multiplexing (WDM) channel or a 'live traffic' narrowband dense wavelength division multiplexing (DWDM) channel to provide an 'inband' testing of an optical cable. The generation of the reflectometry analysis may be performed periodically, such as once per minute, hourly, daily, weekly, or on another periodic basis as needed or desired, so that the amount of time needed for generating the reflectometry analysis fingerprint is proportionally small.

In another example, where a particular optical link represents a multi-mode fiber optic cable, the associated reflectometry analyzer 122, 132, 142, 152, 162, or 172 may utilize a particular light frequency that is reserved for generating continuous reflectometry fingerprints for that optical link. Here, any major changes in the fingerprints can be instantly detected and flagged for further analysis, as needed or desired. In either case, reflectometry analyzers 122, 132, 142, 152, 162, and 172 operate to communicate the fingerprints for each of the optical links to fingerprint database 112 for analysis by signature and path analysis module 114, as described below.

Figure 2:
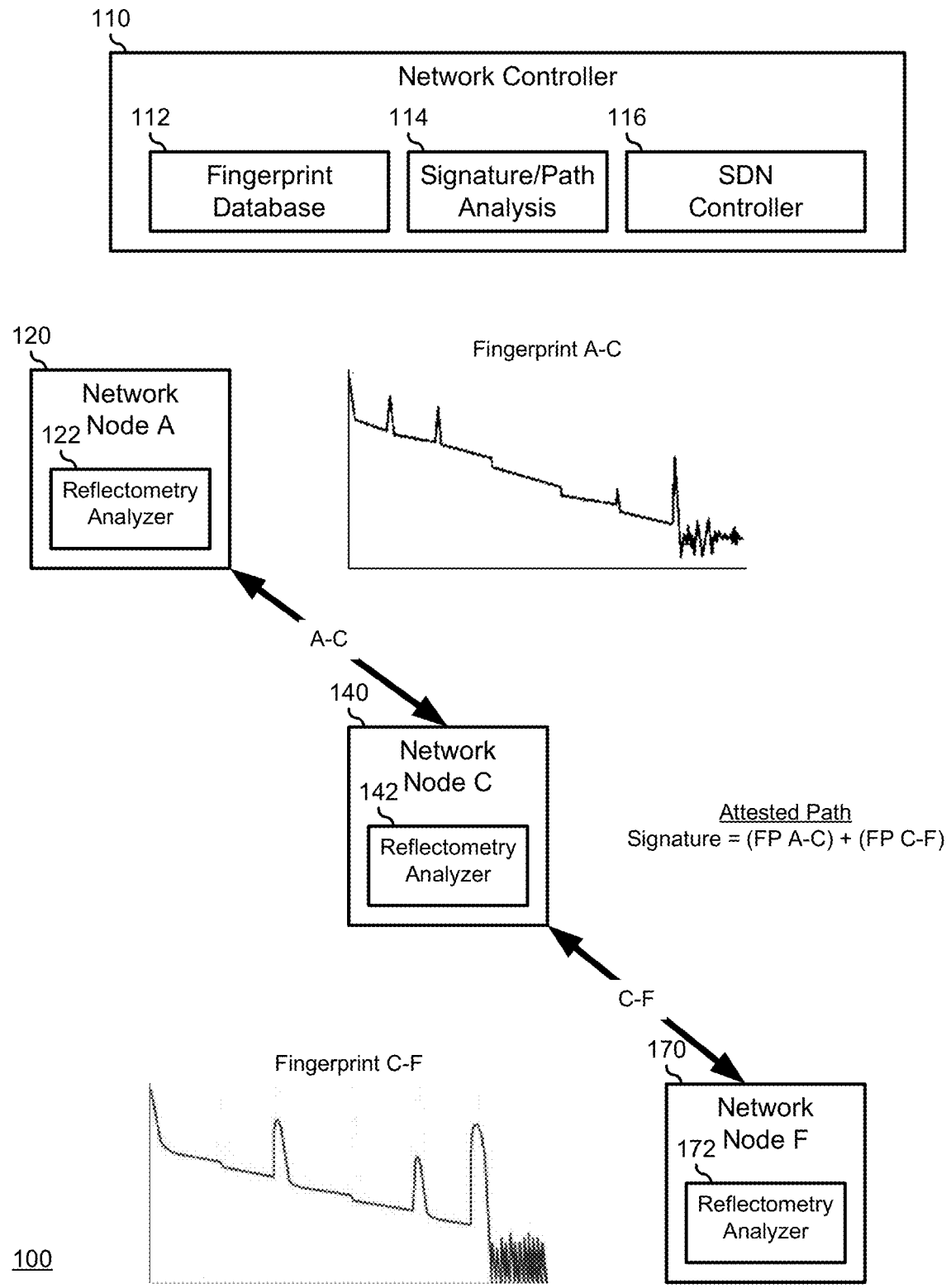

In a particular embodiment, all-photonics network 100 operates to provide validated end-to-end paths between nodes 120, 130, 140, 150, 160, and 170 based upon the fingerprints of the optical links between the nodes. For example, FIG. 2 illustrates all-photonics network 100 with a validated path between nodes 120 and 170, where the path includes the optical link between node 120 and node 140 (optical link A-C) and the optical link between node 140 and node 170 (optical link C-F). Here, reflectometry analyzer 122 provides a fingerprint (Fingerprint A-C) for the optical link from node 120 to node 140 to fingerprint database 112, and reflectometry analyzer 142 provides a fingerprint (Fingerprint C-F) for the optical link from node 140 to node 170.

Signature and path analysis module 114 receives a request to provide a data path between nodes 120 and 170. Signature and path analysis module 114 determines a path that includes node 140. Here, signature and path analysis module 114 may utilize network usage information to determine the path from node 120 through node 140 to node 170, or the path may be provided as a dedicated path to the service of a particular need, such as a client dedicated path, a flow-based dedicated path, a service-level agreement (SLA) based dedicated path, a datacenter-to-datacenter dedicated path, or another dedicated path as needed or desired. Once the path is selected, signature and path analysis module 114 operates to direct SDN controller 116 to establish the network switching such that all data transmissions targeted to the dedicated path are switched in accordance with the path.

Signature and path analysis module 114 then operates to retrieve the most recent fingerprints for the selected optical links (that is Fingerprint A-C and Fingerprint C-F) from fingerprint database 112 and defines a path signature that combines the fingerprints. Thus the signature for the dedicated path between node 120 and node 170 includes Fingerprint A-C and Fingerprint C-F. It will be understood that the reverse path can be similarly validated with reflectometry analyzer 172 providing a fingerprint (for example, Fingerprint F-C, not illustrated), and reflectometry analyzer 142 providing a fingerprint (for example, Fingerprint C-A, not illustrated), as needed or desired. However, if the forward and reverse data is transmitted on a common optical link, such as where the data transmission is provided as time domain multiplexing communications over a common fiber optic cable, the reverse path fingerprints may need to be separately determined from the forward path fingerprints. In any case, the continuous reflectometry analysis of the optical links by reflectometry analyzers 122, 142, and 172 will be provided to fingerprint database 112.

Figure 3:
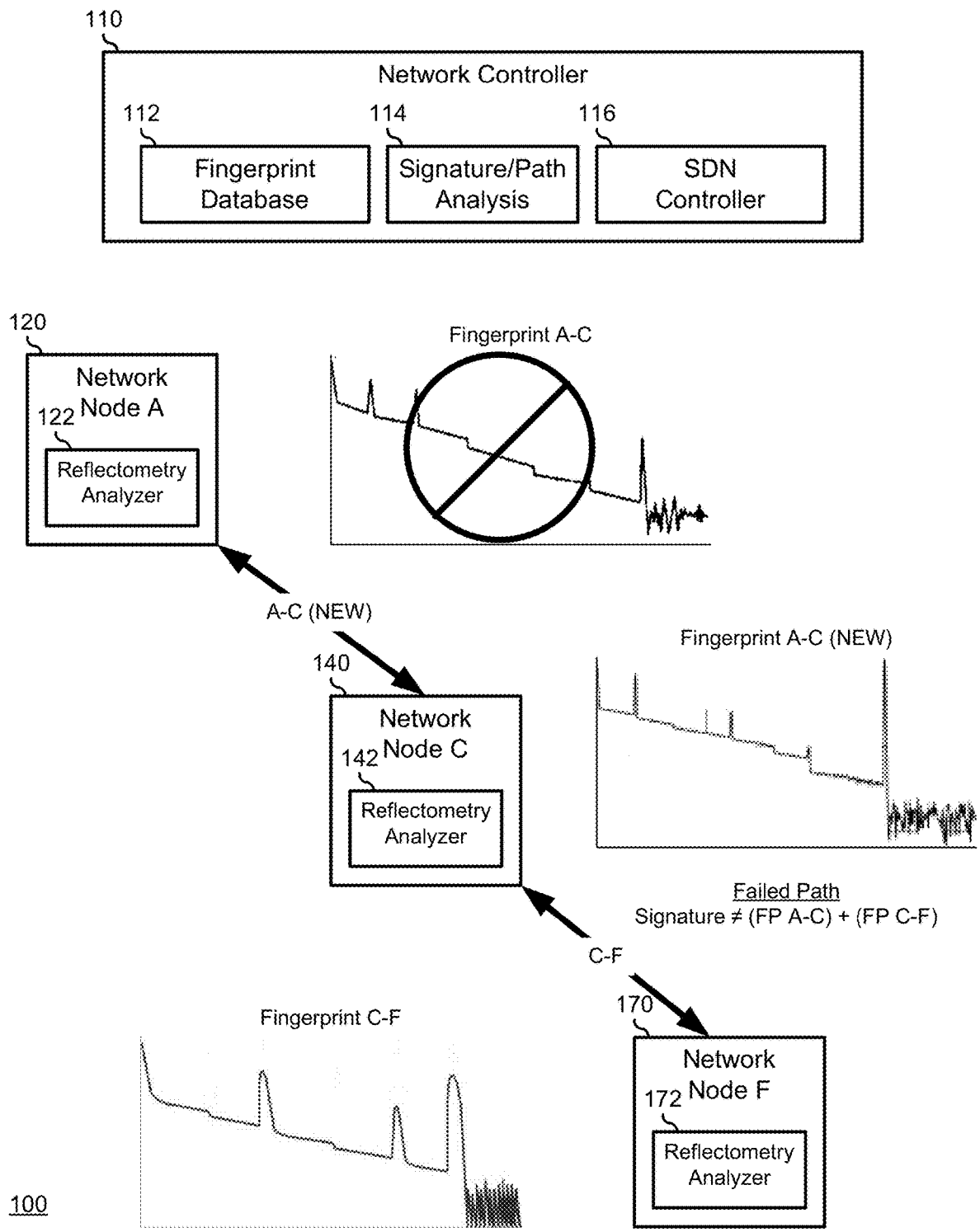

Signature and path analysis module 114 operates to continuously validate that the selected path has not been physically altered in any way, such as by reconfiguring the switching functions of network nodes 120, 130, 140, 150, 160, and 170, or by changing the physical connection of optical fibers to a port of the nodes. For example, in FIG. 3, reflectometry analyzer 122 detects a new fingerprint (Fingerprint A-C(NEW)) on the optical link between node 120 and node 140, and provides the new fingerprint to fingerprint database 112. Upon receiving the new fingerprint at fingerprint database 112, signature and path analysis module 114 analyzes the new fingerprint and determines that it is different from the prior fingerprint for the optical link between node 120 and node 140, and that thus the signature for the entire path between node 120 and node 170 has changed.

In the normal course of operation, the fingerprints for the optical links of all-photonics network 100 will experience a degree of drift over time, resulting from environmental changes in the optical links (temperature, pressure, strain, etc.), aging of the optical links, and the like. Here, signature and path analysis module 114 operates to determine if a change in a fingerprint for the optical links are within expected norms, and are thus not indicative of tampering or changing of the optical links or switching paths, or are of such a character or degree as to indicate that the optical links or switching paths have been tampered with. In a particular embodiment, signature and path analysis module 114 includes a machine learning algorithm that operates to characterize changes in the fingerprints as to whether the changes are within the expected norms. An example of a machine learning algorithm may include a linear regression algorithm, a logistic regression algorithm, a decision tree algorithm, a support vector machine algorithm, a naïve Bayes algorithm, a k-nearest neighbor algorithm, a k-means algorithm, a random forest algorithm, a dimensionality reduction algorithm, a gradient boosting algorithm, or the like.

Upon determining that a change in a fingerprint for the optical links is of such a character or degree as to indicate that the optical link or switching path has been tampered with, signature and path analysis module 114 operates to flag the path as having failed the validation. Here, signal and path analysis module 114 may operate to generate an error indication that can be provided to an error management system for all-photonics network 100 that can provide a work ticket for a network administrator to physically verify the interconnections between the nodes and the optical links, or to take other actions to isolate and repair the path. Network controller 110 acts to halt the data flows over the failed path to ensure that the data flows are not in any way compromised and remain secure, and acts to validate a new path as needed or desired. Here, the establishment and maintenance of the path may be provided in accordance with a service level agreement (SLA) with the user of the path, and so there may be contractual obligations to ensure a level of security for the data flows.

A complete halt of such data flows may be more desirable than the potential of a security breach, and so signature and path analysis module 114 may perform a complete shutdown of such flows over the compromised path until an alternative path can be validated. Finally signature and path analysis module 114 operates to establish and validate a new path for the data flows between the desired nodes. Here, where fingerprint database 112 includes the fingerprints for all of the optical links, the establishment and validation of a new path may be a simple matter of analyzing new path options, selecting the new path, and directing SDN controller 116 to establish the new path. However, where a new path can not be created with the existing data in fingerprint database 112, signature and path analysis module 114 may direct reflectometry analyzers 122, 132, 142, 152, 162, and 172 to analyze new optical links to determine a new path, as needed or desired.

As depicted herein, the fingerprints (for example, Fingerprint A-C, Fingerprint A-C (NEW), and Fingerprint C-F) are illustrated as simplistic line traces that result from a single analysis cycle of the associated reflectometry analyzers 122 and 142. That is, the illustrated fingerprints are depictions of the backscatter traces received by reflectometry analyzers 122 and 142 from a single issuance of the test signal (for example, an ODTR or ODFR trace) by each reflectometry analyzer. It has been understood by the inventors of the current disclosure that, in the real-world situation, no two analysis cycle results for a given optical link will be identical due to the varying conditions on the optical link. For example, a typical optical link may be subject to various displacement events, atmospheric events, or other events that impact the precise profile of the analysis cycle results, and such impacts are significantly randomized from one analysis cycle to the next.

Displacement events may include vibrations in the ground surrounding a buried optical link, such as where a optical link is buried under a roadway where vehicle traffic on the roadway induces vibrations into the optical link, vibrations in a sub-sea optical link where ocean waves or storms may induce vibrations into the optical link, vibrations in either a terrestrial or sub-sea optical link due to seismic events, or other vibrations or shocks experienced by any portion of an optical link. Atmospheric events may include changes in the temperature, pressure, or humidity in the atmosphere surrounding all or a portion of the optical link. As a result, the direct product of the continuous monitoring of an optical link may be chaotic, and not subject to direct interpretation to extract the fingerprint, and additional analysis is therefore needed to extract the fingerprint for each optical link.

Figure 4:
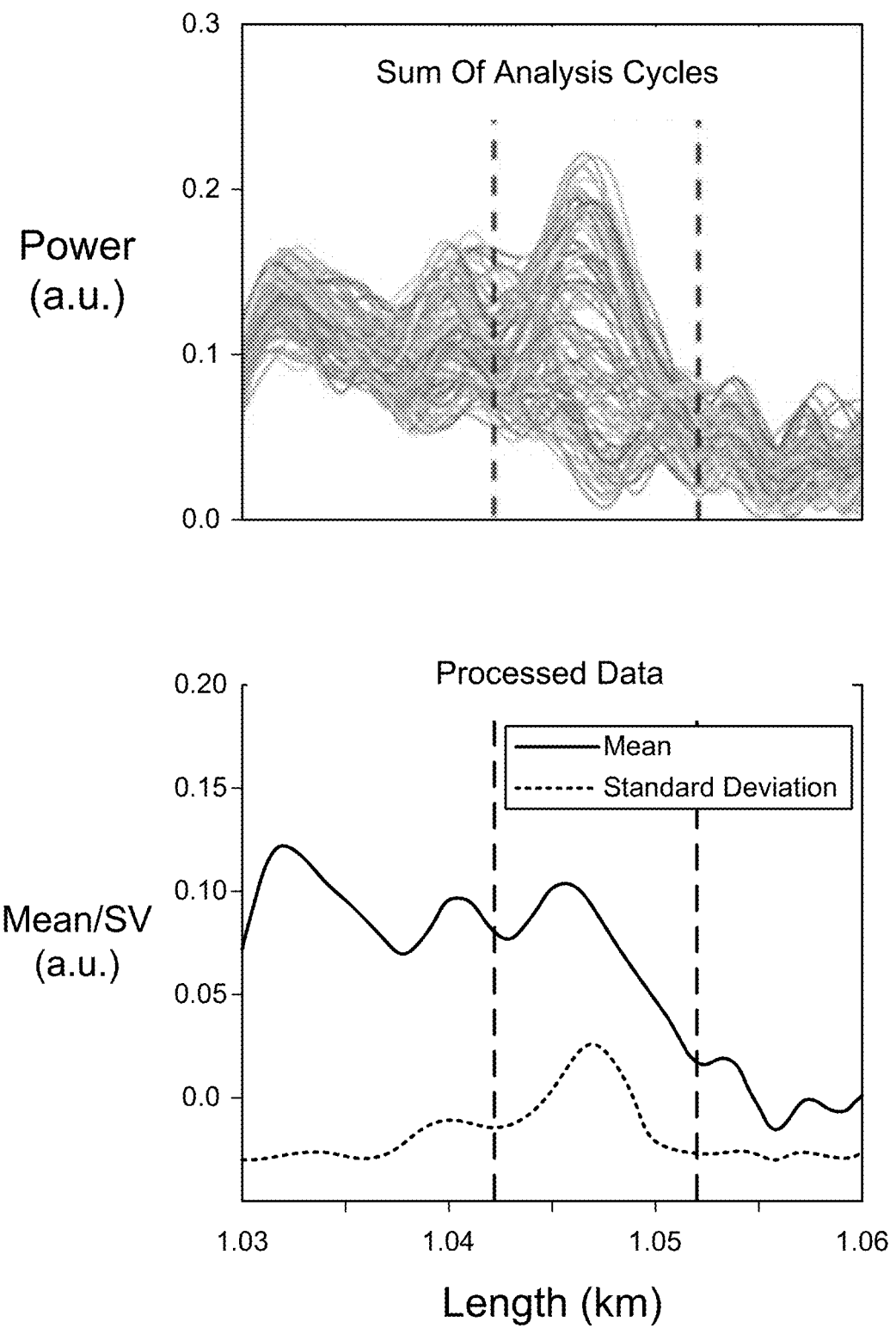
FIG. 4 illustrates the extraction of a fingerprint results according to an embodiment of the current disclosure.

FIG. 4 illustrates fingerprint graphs for a portion of an optical link. The top graph illustrates the sum of the results from a large number of analysis cycles. From this graph, it can be seen that an extracted fingerprint is not readily identified. In a particular embodiment, a reflectometry analyzer analyzes the real time results of the continuous analysis cycles from the reflectometry analyzers for the associated optical link to determine the fingerprint for the optical links. For example, a reflectometry analyzer can utilize various machine learning algorithms to extract a fingerprint for each optical link. In a particular case, the fingerprint can include a mean value curve for the length of the optical link and an associated standard deviation curve, as shown in the bottom graph of FIG. 4.

As an example, the optical link associated with FIG. 4 may have several discontinuities, as shown by the peaks in the mean value graph, and may be understood to pass under a roadway at the portion indicated between the dashed vertical lines. Here, the vibration from vehicles on the roadway will contribute to a higher standard deviation between the vertical lines. An example of a machine learning algorithm may include a linear regression algorithm, a logistic regression algorithm, a decision tree algorithm, a support vector machine algorithm, a naïve Bayes algorithm, a k-nearest neighbor algorithm, a k-means algorithm, a random forest algorithm, a dimensionality reduction algorithm, a gradient boosting algorithm, a directed acyclic graph (DAG) algorithm, or the like. It will be understood that the level of processing needed to extract a fingerprint from a reflectometry analyzer may be more than is practically provided on the typical network node. As such, the functions and features of the reflectometry analyzers as described above, may be performed by a signature and path analysis module similar to signature and path analysis module 114, or by another processing element of the associated all-photonics network as needed or desired.

After determining the fingerprint for a particular optical link, as described above, a signature and path analysis module can much more readily identify anomalous behavior in the optical link. As an extreme example, a completely different fingerprint profile may indicate that the optical link has been substituted with a completely different optical link, such as may occur with an inadvertent reconnecting of optical cables in a datacenter, or with a malicious activity such as a man-in-the-middle attack where a malicious actor seeks to siphon the data stream to a listening device and then rebroadcast the data stream to its destination. However, a signal and path analysis module can make more fine-grained analysis of activities on an optical link. For example, continuing the example above where the optical link runs under a roadway, various correlations with the fingerprint are possible.

For example, the fingerprint, and particularly the standard deviation may be understood to vary with time, as traffic patterns change with time of day or with day of the week, and anomalies that occur that are higher than the expected vibration pattern at busy times, or that occur at normally quiescent times may indicate digging activities in the proximity of the optical link. Here, while the anomalous activity may be benign in nature, the monitoring of the optical link fingerprint in real time may give advanced warning of construction digging, permitting time to investigate and preclude the inadvertent cutting of the optical link. In another regard, the patterns of vibrations in a sub-sea optical link may be correlated with various known malicious activities, such as sonar traces of sub-sea craft engaged in espionage, or of known profiles of handling a cable in preparation for the insertion of tapping devices.

In a further example, gradual changes in either the optical link or the ambient environment of the optical link can be distinguished from more abrupt changes that would indicate a problem associated with the optical link. For example, age related changes in an optical link would be expected to be exhibited in gradual changes to the mean fingerprint, while changes in the environment, such as traffic flow increases, would be expected to be exhibited in gradual changes to the standard deviation profile. Here, a signature and path analysis module may track the rate of change in both the mean fingerprint profile and the standard deviation fingerprint profile. It will be understood that statistical modeling of an optical link may encompass other statistical tools, in addition to a mean function and a standard deviation function, and that the incorporation of other statistical modeling functions may be applied in analyzing an optical link, as needed or desired, and the scope of the current disclosure is intended to encompass such other statistical modeling functions as may be deemed to illuminate the real-time status of the optical link, as needed or desired.

Figure 5:
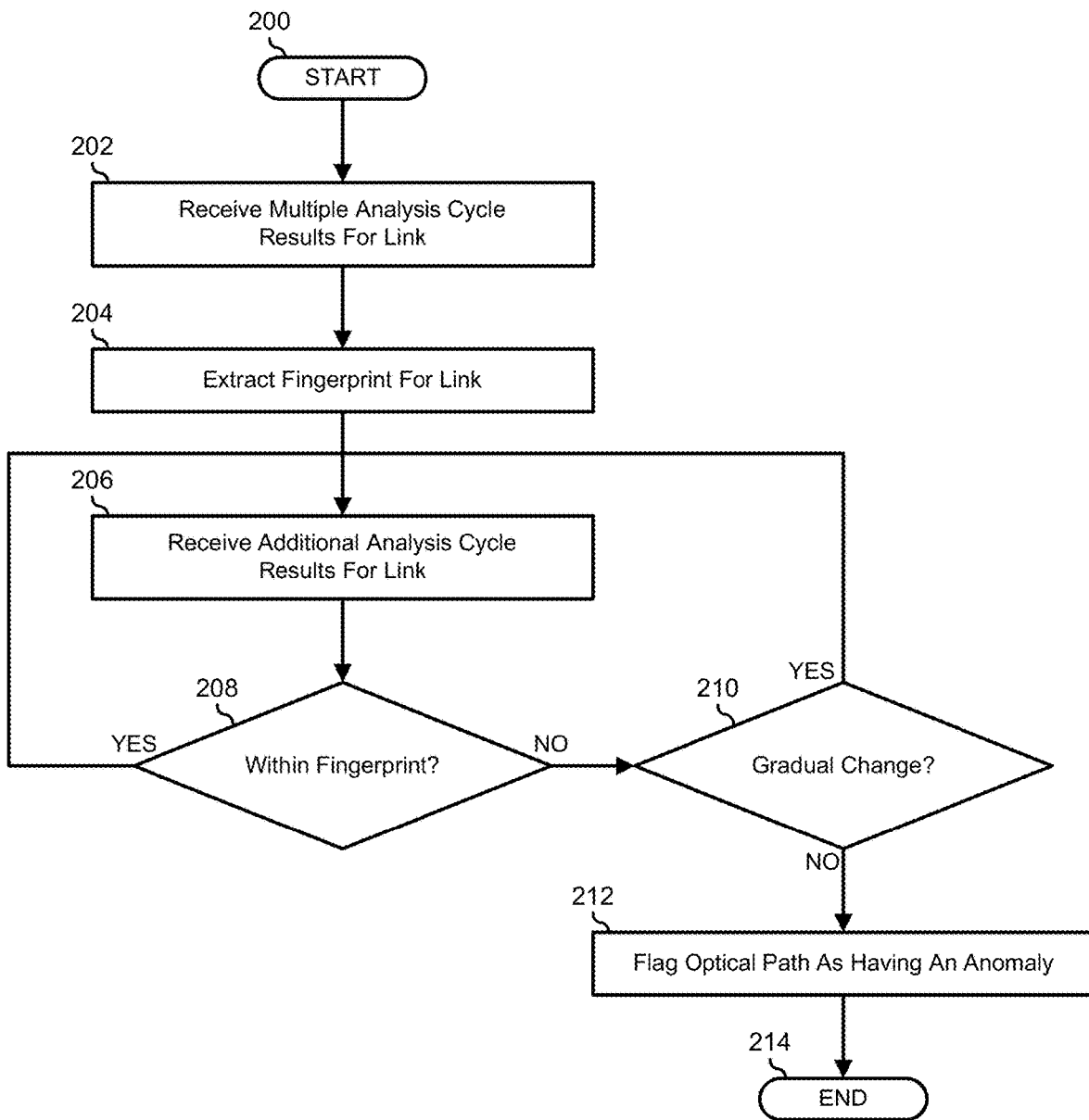
FIG. 5 is a flow chart illustrating a method for establishing and maintaining a secure and attested fingerprint for an optical link according to an embodiment of the current disclosure.

FIG. 5 illustrates a method for establishing and maintaining a secure and attested optical link starting at block 200. A processor such as a reflectometry analyzer or a signature path analysis module receives multiple reflectometry analysis cycle results for a particular optical link in block 202. The processor utilizes various machine learning techniques to extract a fingerprint for the optical link from the multiple results in block 204. The processor receives additional reflectometry analysis cycle results for the optical link in block 206. A decision is made as to whether or not any of additional results are within bounds set by the fingerprint in decision block 208. For example, the additional results may be outside of a standard deviation of the fingerprint, or may be within the bounds of the standard deviation.

If the additional results are within the bounds set by the fingerprint, the "YES" branch of decision block 208 is taken and the method returns to block 206 where further reflectometry analysis cycle results are received. If the additional results are not within the bounds set by the fingerprint, the "NO" branch of decision block 208 is taken and a decision is made as to whether the additional results indicate a gradual change in the optical link in decision block 210. For example, the additional results may indicate a gradual change in the condition of the optical link or in the environment surrounding the optical link. If the additional results indicate a gradual change in the optical link, the "YES" branch of decision block 210 and the method returns to block 206 where further reflectometry analysis cycle results are received. If additional results do not indicate a gradual change in the optical link, the "NO" branch of decision block 210 is taken, the optical link is flagged as having an anomaly in block 212, and the method ends in block 214.

In addition to finding a particular optical link to be sound or to be experiencing an anomaly, as described above, a machine learning algorithm may be utilized to provide a graded status for the optical links that gives a more nuanced picture of the optical links of all-photonics network 100. Thus, in a particular embodiment, given a mean value portion of a fingerprint, a particular optical link may be ascribed an age-related status based upon the expected drift of the mean value of the fingerprint over time. For example, a particular optical link that is newly installed can be given a link status of good, or green, while an older optical link can be given a link status of fair, or yellow, and an optical link that is nearing or past a replacement threshold can be given a link status of poor, or red based upon an expected drift in the mean value over time. Other examples of green-yellow-red statuses may include statuses for the number of outliers that are detected in a given amount of time (e.g., a week, a month, a year, etc.), a standard deviation of the link latency, or the like. Further, a scoring and accumulated database may be utilized to determine a confidence level, as needed or desired.

Further, the mean value portion of the fingerprint can be utilized to define whether or not a different optical link has been substituted of the original optical link based upon large changes in the mean value, such as the number, placement, location, and magnitude of discontinuities seen in the mean value graph. Where a different optical link has been substituted for the original optical link, the optical link can be given a link status of disrupted, or red. The link status of the newly placed optical link can be maintained as disrupted, or red, until such time that the physical status of the optical link can be confirmed. For example a technician may have substituted a new optical cable, and the placement can be verified at the network node, or the optical cable may be under malicious attack that can be detected and mitigated.

In another embodiment, given a standard deviation portion of a fingerprint, a particular optical link may be ascribed an environment-related status based upon the degree to which ongoing reflectometry analysis cycle results are within the expected standard deviation, and, as noted above, the standard deviation portion may be provided as a time-of-day correlated value, a day-of-the-week correlated value, or another correlation value, as needed or desired. For example, where the optical link is providing reflectometry analysis cycle results that are within the standard deviation for a particular correlated standard deviation curve, the link can be given a link status of good, or green, where the link is providing reflectometry analysis cycle results that are outside the standard deviation for a particular correlated standard deviation curve, but the degree of the difference or the duration of the difference is modest, the link can be given a link status of fair, or yellow, and the link is providing reflectometry analysis cycle results that are widely outside the standard deviation for a particular correlated standard deviation curve in terms of degree or duration, the link can be given a link status of poor, or red. The environment-related status can be maintained until normalcy is returned, as measured by reflectometry analysis cycle results returning to within the correlated standard deviation curve, or until such time that the physical status of the optical link can be confirmed.

In another embodiment, optical link fingerprints are utilized to determine a transmission time latency for each of the optical links. Here, the reflectometry analysis test cycle time may be utilized to infer the latency ($T_L$) for each optical link, where:

$$T_L = T_C/2 \qquad \text{Equation 1;}$$

where $T_C$ is the reflectometry analysis test cycle time.

Figure 6:
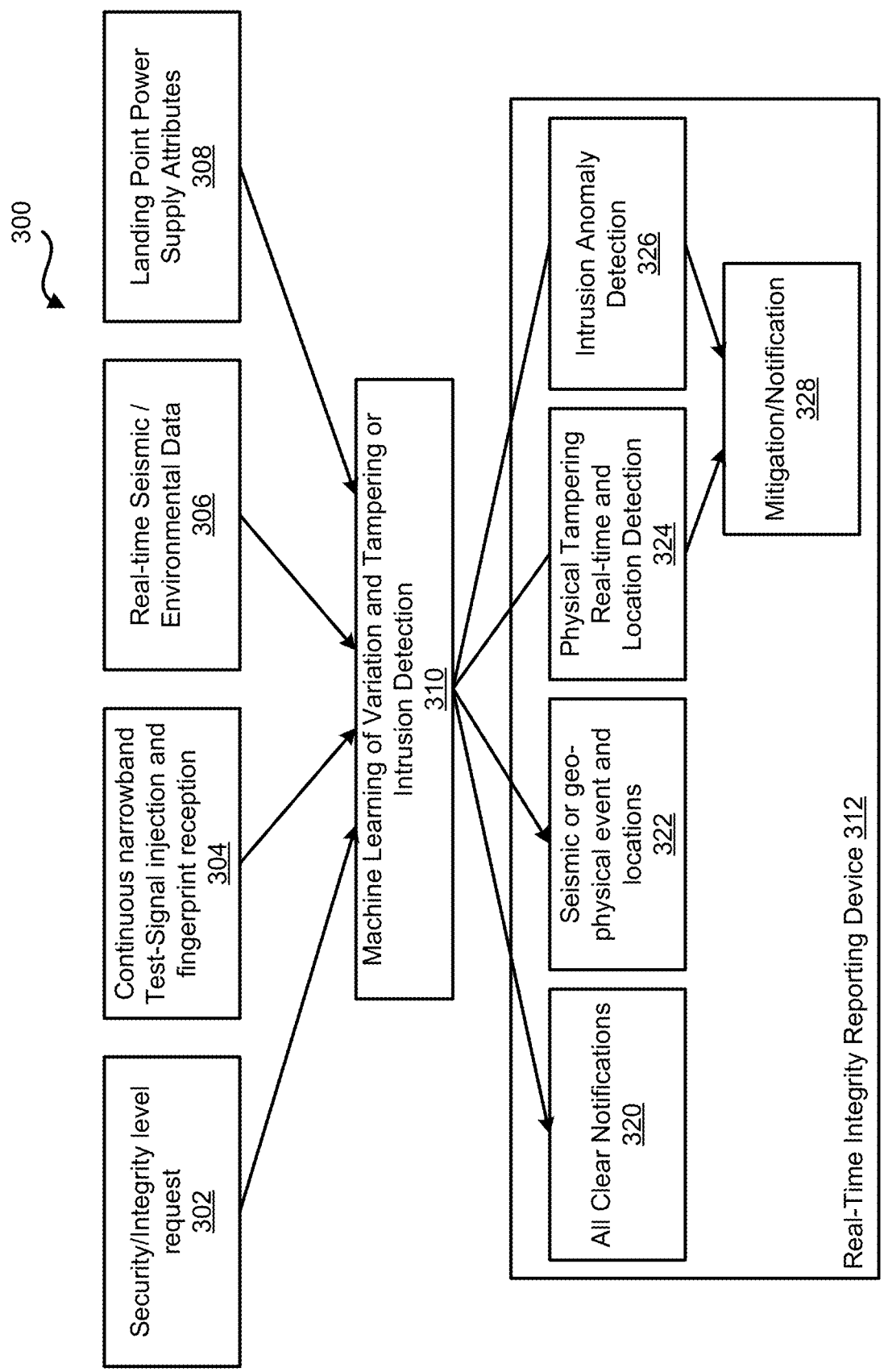
FIG. 6 illustrates operations performed within a reflectometry analyzer system of a node in an all-photonics network according to an embodiment of the current disclosure.

FIG. 6 illustrates operations performed within a reflectometry analyzer system 300 of a node in a long haul all-photonics network according to an embodiment of the current disclosure. Reflectometry analyzer system 300 may receive multiple inputs 302, 304, 306, and 308, a machine learning device 310 may perform one or more operations on the inputs, and provide one or more outputs via a real-time integrity reporting device 312. Reporting device 312 may provide multiple outputs 320, 322, 324, 326, and 328. In certain examples, machine learning device 310 and reporting device 312 may be different components within reflectometry analyzer system 300, as shown in FIG. 6, or may be combined within a single device without varying from the scope of this disclosure. In an example, reflectometry analyzer system 300 may include additional components and operations over those shown in FIG. 6 without varying from the scope of this disclosure. Reflectometry analyzer system 300 may be any suitable hardware device including, but not limited to, a processor, such as processor 402 of FIG. 7.

In an example, reflectometry analyzer system 300 may receive suitable data to determine whether a network cable has been tampered with, such that an intrusion into the networks is detected. For example, the input data may include a security/integrity level request 302, a continuous narrowband test-signal injection and fingerprint reception 304, real-time seismic/environmental data 306, and landing point power supply attributes 308.

Security/integrity level request 302 may be any request received from an individual/administrator or an automated controller of the optical network identifying a particular level of security or integrity to maintain only the cable of the optical network. Continuous narrowband test-signal injection and fingerprint reception 304 may be any suitable set of operations to detect a federated optical fingerprint for the network, such as the operations described above with respect to FIG. 4. In an example, the test signal may be injected into the optical network in any suitable manner, such as an in-band signal that is simultaneous to and parallel with the transmission data. In this example, the test signal may be provided at a different wavelength from the other data transmitted to prevent the test signal from interfering with the data transmission. Real-time seismic/environmental data 306 may be any data associated with natural events that may affect the cable in the optical network. For example, real-time seismic/environmental data 306 may be data identifying an earthquake near the optical network, temperature changes around the cables of the network, storms near the network, or the like. In an example, landing point power supply attributes 308 may include any suitable data for the supplied power at a particular amplifier of the optical network. For example, landing point power supply attribute 308 may include an amount of current provided to a particular optical amplifier or the multiple amplifiers across the cable span, the voltage level at the optical amplifiers, or the like. Security/integrity level request 302, test-signal injection and fingerprint reception 304, real-time seismic/environmental data 306, and landing point power supply attributes 308 may be provided to machine learning device 310.

In an example, machine learning device 310 may utilize input 302, 304, 306, and 308 to determine variations or anomalies in the inputs overtime and detect whether an intrusion of a cable in the optical network has occurred. Machine learning device 310 may analyze the feedback data, and may continuously receive the fingerprints of the different sections of the cable in the optical network. In an example, if a fingerprint variation from one fingerprint to the next for a particular section of the cable is smaller than a particular threshold, machine learning device 310 may variation as an acceptable variation and store the new fingerprint in a table or other database for later reference.

If machine learning device 310 merely detects slow or slight fluctuations in the fingerprints of the sections in the cable and detects constant power supply voltage attributes for the amplifiers along the cable, machine learning device 310 may provide all clear notifications 320 to real-time integrity reporting device 312. Machine learning device 310 may detect a possible physical tampering of the cable in the optical network. In an example, a possible physical tampering may be detected based on machine learning device 310 detecting a change in an amount of power drawn by any section of the cable of the optical network, detecting a high, drastic, or distinct change in any one of feedback fingerprints from the cable of the optical network, or the like.

In an example, machine learning device 310 may perform one or more operations to determine a location of the possible tampering. For example, machine learning device 310 may utilize the table of fingerprints to determine a particular section of the cable associate with the feedback fingerprint having a drastic fluctuation. As stated above, each section of the cable may have a different fingerprint, such that machine learning device 310 may determine the exact section of the cable with the fluctuation of the fingerprint based on the fingerprint that has changed while the fingerprints for the other section may remain the same. In certain examples, tampering of the cable may cause a particular section to bend and/or vibrate, which in turn may cause a change in the fingerprint for that section of the cable. In an example, machine learning device 310 may utilize landing point power supply attributes 308 to determine a particular amplifier or section of cable before the particular amplifier that has changed the amount of power drawn.

After determining a particular section of the cable associated with the possible tampering, machine learning device 310 may compare the location of the section of cable with real-time environmental data 306 to determine whether the possible tampering detection may be correlated with an environmental event in the same area. For example, if a storm, an earthquake, an abrupt change in temperature, or the like has occurred at or near the location of the possible tampering, machine learning device 310 may provide reporting device 312 with a notification 322 that the possible tampering is a result of an environmental event and no action is required.

In an example, machine learning device 310 may determine that the possible tampering is not associated with an environmental event. In this situation, machine learning device 310 may provide reporting device 312 with a physical tampering detection notification 324 and/or an intrusion anomaly detection notification 326. In an example, physical tampering detection notification 324 may include data indicating a time that the tampering occurred and the location of the tampering.

Reporting device 312 may utilize the tampering notification 324 and intrusion anomaly detection 326 to determine a mitigation action or notification 328. In an example, mitigation action or notification 328 may include any suitable operation to prevent the tampering of the cable in the optical network from compromising the data transmitted along the cable. For example, mitigation action or notification 328 may include, but is not limited to, flagging the tampering event, re-routing data to another optical cable, provide feedback information to a company or organization associated with the optical network. Based on notifications 320, 322, 324, and 326, reporting device 312 may provide any suitable data including, but not limited to, governance certificates with fingerprint metadata, commercial platform control, environmental events, physical tampering and locations, intrusion detection, and company/organization notifications. In certain examples, the notifications and other outputs from reporting device 312 may be provided in real-time based on the continuous injection of the test pulse on the cable of the optical network.

In an example, the governance certificates with fingerprint metadata may verify the integrity of the cable within the optical network. These certificates may allow the network operator to provide premium services with secure paths to customers and other users. Additionally, the output notifications from reporting device 312 may enable an administrator of the optical network to perform proactive maintenance on the cable based on the notifications providing performance and characteristics of each segment along the cable. In an example, the fingerprints of the different sections of the cable may be utilized as security keys for information transmitted along the optical network. For example, data may be verified by a node in the optical system based on a federated fingerprint received with the data matching a stored federated fingerprint as calculated and stored by machine learning device 310.

FIG. 6 illustrates operations performed within a reflectometry analyzer system 300 of a node in a long haul all-photonics network according to an embodiment of the current disclosure. Reflectometry analyzer system 300 may receive multiple inputs 302, 304, 306, and 308, a machine learning device 310 may perform one or more operations on the inputs, and provide one or more outputs via a real-time integrity reporting device 312. Reporting device 312 may provide multiple outputs 320, 322, 324, 326, and 328. In certain examples, machine learning device 310 and reporting device 312 may be different components within reflectometry analyzer system 300, as shown in FIG. 6, or may be combined within a single device without varying from the scope of this disclosure. In an example, reflectometry analyzer system 300 may include additional components and operations over those shown in FIG. 6 without varying from the scope of this disclosure. Reflectometry analyzer system 300 may be any suitable hardware device including, but not limited to, a processor, such as processor 402 of FIG. 7.

In an example, reflectometry analyzer system 300 may receive suitable data to determine whether a network cable has been tampered with, such that an intrusion into the networks is detected. For example, the input data may include a security/integrity level request 302, a continuous narrowband test-signal injection and fingerprint reception 304, real-time seismic/environmental data 306, and landing point power supply attributes 308.

Security/integrity level request 302 may be any request received from an individual/administrator or an automated controller of the optical network identifying a particular level of security or integrity to maintain only the cable of the optical network. Continuous narrowband test-signal injection and fingerprint reception 304 may be any suitable set of operations to detect a federated optical fingerprint for the network, such as the operations described above with respect to FIG. 4. In an example, the test signal may be injected into the optical network in any suitable manner, such as an in-band signal that is simultaneous to and parallel with the transmission data. In this example, the test signal may be provided at a different wavelength from the other data transmitted to prevent the test signal from interfering with the data transmission. Real-time seismic/environmental data 306 may be any data associated with natural events that may affect the cable in the optical network. For example, real-time seismic/environmental data 306 may be data identifying an earthquake near the optical network, temperature changes around the cables of the network, storms near the network, or the like. In an example, landing point power supply attributes 308 may include any suitable data for the supplied power at a particular amplifier of the optical network. For example, landing point power supply attribute 308 may include an amount of current provided to a particular optical amplifier or the multiple amplifiers across the cable span, the voltage level at the optical amplifiers, or the like. Security/integrity level request 302, test-signal injection and fingerprint reception 304, real-time seismic/environmental data 306, and landing point power supply attributes 308 may be provided to machine learning device 310.

In an example, machine learning device 310 may utilize input 302, 304, 306, and 308 to determine variations or anomalies in the inputs overtime and detect whether an intrusion of a cable in the optical network has occurred. Machine learning device 310 may analyze the feedback data, and may continuously receive the fingerprints of the different sections of the cable in the optical network. In an example, if a fingerprint variation from one fingerprint to the next for a particular section of the cable is smaller than a particular threshold, machine learning device 310 may variation as an acceptable variation and store the new fingerprint in a table or other database for later reference.

If machine learning device 310 merely detects slow or slight fluctuations in the fingerprints of the sections in the cable and detects constant power supply voltage attributes for the amplifiers along the cable, machine learning device 310 may provide all clear notifications 320 to real-time integrity reporting device 312. Machine learning device 310 may detect a possible physical tampering of the cable in the optical network. In an example, a possible physical tampering may be detected based on the machine learning device 310 detecting a change in an amount of power drawn by any section of the cable of the optical network, detecting a high, drastic, or distinct change in any one of feedback fingerprints from the cable of the optical network, or the like.

In an example, machine learning device 310 may perform one or more operations to determine a location of the possible tampering. For example, machine learning device 310 may utilize the table of fingerprints to determine a particular section of the cable associate with the feedback fingerprint having a drastic fluctuation. As stated above, each section of the cable may have a different fingerprint, such that machine learning device 310 may determine the exact section of the cable with the fluctuation of the fingerprint based on the fingerprint that has changed while the fingerprints for the other section may remain the same. In certain examples, tampering of the cable may cause a particular section to bend and/or vibrate, which in turn may cause a change in the fingerprint for that section of the cable. In an example, machine learning device 310 may utilize landing point power supply attributes 308 to determine a particular amplifier or section of cable before the particular amplifier that has changed the amount of power drawn.

After determining a particular section of the cable associated with the possible tampering, machine learning device 310 may compare the location of the section of cable with real-time environmental data 306 to determine whether the possible tampering detection may be correlated with an environmental event in the same area. For example, if a storm, an earthquake, an abrupt change in temperature, or the like has occurred at or near the location of the possible tampering, machine learning device 310 may provide reporting device 312 with a notification 322 that the possible tampering is a result of an environmental event and no action is required.

In an example, machine learning device 310 may determine that the possible tampering is not associated with an environmental event. In this situation, machine learning device 310 may provide reporting device 312 with a physical tampering detection notification 324 and/or an intrusion anomaly detection notification 326. In an example, physical tampering detection notification 324 may include data indicating a time that the tampering occurred and the location of the tampering.

Reporting device 312 may utilize the tampering notification 324 and intrusion anomaly detection 326 to determine a mitigation action or notification 328. In an example, mitigation action or notification 328 may include any suitable operation to prevent the tampering of the cable in the optical network from compromising the data transmitted along the cable. For example, mitigation action or notification 328 may include, but is not limited to, flagging the tampering event, re-routing data to another optical cable, provide feedback information to a company or organization associated with the optical network. Based on notifications 320, 322, 324, and 326, reporting device 312 may provide any suitable data including, but not limited to, governance certificates with fingerprint metadata, commercial platform control, environmental events, physical tampering and locations, intrusion detection, and company/organization notifications. In certain examples, the notifications and other outputs from reporting device 312 may be provided in real-time based on the continuous injection of the test pulse on the cable of the optical network.

In an example, the governance certificates with fingerprint metadata may verify the integrity of the cable within the optical network. These certificates may allow the network operator to provide premium services with secure paths to customers and other users. Additionally, the output notifications from reporting device 312 may enable an administrator of the optical network to perform proactive maintenance on the cable based on the notifications providing performance and characteristics of each segment along the cable. In an example, the fingerprints of the different sections of the cable may be utilized as security keys for information transmitted along the optical network. For example, data may be verified by a node in the optical system based on a federated fingerprint received with the data matching a stored federated fingerprint as calculated and stored by machine learning device 310.

Figure 7:
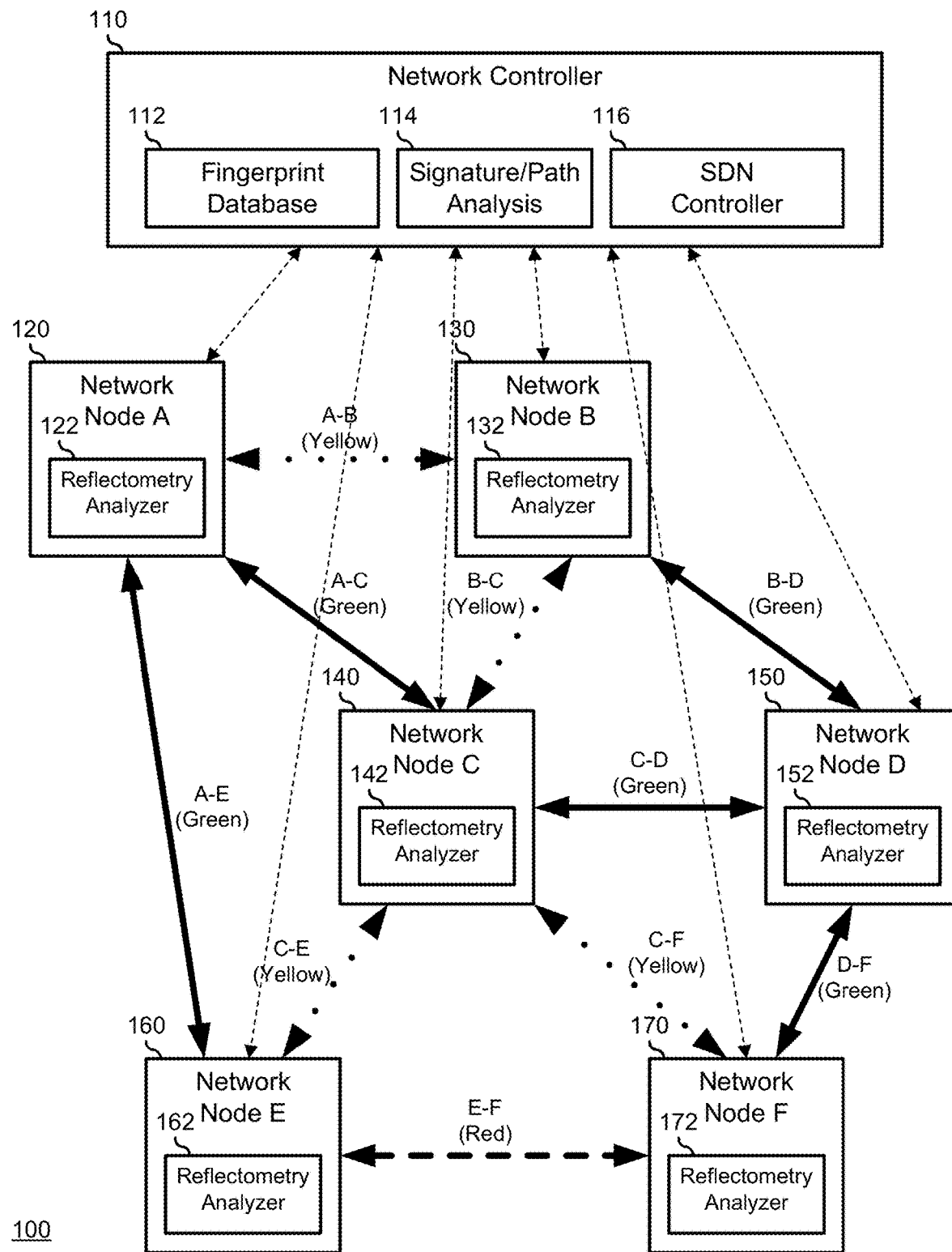
FIG. 7 illustrates path routing decisions in the all-photonics network of FIG. 1.

FIG. 7 illustrates path routing decisions in the all-photonics network of FIG. 1. Here, optical links A-C, A-E, B-D, C-D and D-F are illustrated as having a green link status, as indicated by the solid lines, links A-B, B-C, C-E, and C-F are illustrated as having a yellow status, as indicated by the dotted lines, and link E-F is illustrated as having a red status, as indicated by the dashed line. In this regard, the contents of FIG. 6 may be further understood to represent a graphical display of all-photonics network 100, where the link status of each optical link is shown in its associated status color, in contrast to the solid, dotted, or dashed lines of the figure, or in addition to the solid, dotted, or dashed lines of the figure.

Where such a graphical display is provided on an information handling system, the graphical display may include clickable links for each optical link, such that a user may select a particular optical link, and the graphical display may zoom in on the selected optical link to show details of the indicated status, such as whether the status is related to the age-related deterioration status, the reliability status, the latency status, or the security attestation status. The graphical display may further permit the selection of the status history for each optical link, including selectively viewing one or more of the fingerprints, including the mean and the standard deviation where the fingerprint is provided as such, the current reflectometry test cycle results, the most recent excursions from the fingerprint, and the like. The graphical display may further permit the user to zoom into various portions along the length of the optical link to view the details with higher resolution.

A graphical display may be understood to utilize the information described above from fingerprint database 112. As such, fingerprint database 112 receives the reflectometry analysis test cycle results for each optical link, and signature and path analysis module 114 operates to derive the fingerprints, as described above, from the data stored in the fingerprint database. Once the fingerprint is derived by signature and path analysis module 114, fingerprint database 112 can flush the reflectometry analysis test cycle results utilized for deriving the fingerprints, or can continue to store some or all of the reflectometry analysis test cycle results as needed or desired.

Further, in the ongoing determination of the status of each optical link, as described above, fingerprint database 112 can flush the ongoing reflectometry analysis test cycle results, or can continue to store some or all of the reflectometry analysis cycle results as needed or desired. The granularity of the decision to flush or store the reflectometry analysis test cycle results may be user selectable, or may vary based upon the circumstances and results exhibited by each particular optical link. For example, where a particular optical link has long stretches of time that exhibit few excursions or anomalies, the number of stored reflectometry analysis test cycle results can be decreased as compared with another optical link that more routinely exhibits excursions or anomalies as needed or desired.

Table 1, below, illustrates an example of fingerprint database 112.

correlated standard deviation fingerprints, or other correlated fingerprints, as needed or desired. Further, each entry will include one or more status indication, including an age-related/reliability status indication, an excursion/anomaly status indication, a latency status indication, a security attestation status indication, and any other status indications as needed or desired. The excursion/anomaly status indication is accompanied by an anomaly percentage indication and an anomaly location indication. A typical ODTR or OFDR test result may include 10 k-20 k individual sampled test points.

In this regard, the anomaly percentage may be given as a percentage (A) at which a particular test point is outside of the expected fingerprint, where:

$$A = P_A / (P_T / L) \qquad \text{Equation 2;}$$

where $P_A$ is the number of test points that are outside the expected fingerprint, $P_T$ is the total number of test points, and L is the length of the optical link. The anomaly location can be determined based upon the location in the sequence of test points where the anomaly occurs and the length of the optical link. Each entry may further include other fields as needed or desired, including, but not limited to historical fingerprint and anomaly information, based upon which signature and path analysis module 114 may operate to determine trending information, historical anomaly information, historical latency information, historical attestation information, or other information for other analysis based upon the historical information. As such, fingerprint database 112 represents a link diary for the lifetime of each of the optical links of all-photonics network 100.

Note that the graded status may be utilized in terms of determining a routing performance of all-photonics network 100, such as where an aged optical link may be expected to experience higher error rates than newer optical links. The graded status may be utilized in maintaining performance-based Service Level Agreements (SLAs) with various users of all-photonics network 100. As such, a user with a higher level of performance definition in their SLA may demand that the paths for their traffic only traverse optical links that have a good, or green, status, while another user with a lower level of performance definition in their SLA may be satisfied with traffic that traverses fair, or yellow, optical links, or even poor, or red, optical links. Also, the graded status may be utilized in terms of defining a route latency for the all-photonics network.

TABLE 1

| Optical Link | Fingerprint Baseline | SD | Age/Rel. Status | Anomaly Status | Anomaly % | Anomaly Location | Latency Status | Security Status |
|---|---|---|---|---|---|---|---|---|
| A-B | XXX | XXX | Fair | Fair | 5 | 0.15 | Good | Fair |
| A-C | XXX | XXX | Good | Good | 0 | — | Good | Good |
| A-E | XXX | XXX | Good | Good | 0 | — | Good | Good |
| B-C | XXX | XXX | Good | Good | 0 | — | Fair | Fair |
| B-D | XXX | XXX | Good | Good | 0 | — | Good | Good |
| C-D | XXX | XXX | Good | Good | 0 | — | Good | Good |
| C-E | XXX | XXX | Good | Good | 0 | — | Fair | Fair |
| C-F | XXX | XXX | Fair | Good | 0 | — | Good | Fair |
| D-F | XXX | XXX | Good | Good | 0 | — | Good | Good |
| E-F | XXX | XXX | Good | Poor | 10 | 0.60 | Good | Poor |

Here, each optical link in all-photonics network 100 will be represented as an entry in fingerprint database 112. In addition, each entry includes the associated fingerprint, including a baseline fingerprint and one or more time- A user with a SLA that defines that their traffic traverses a lowest latency route, the path good, or green status, or a signature and path analyzer module may determine that a fewer number of hops over particular optical links with longer individual latencies may ultimately be faster than a route with more hops but with shorter individual latencies. Similarly, the graded status may be utilized in terms of defining a route security of the all-photonics network. A user with a SLA that defines that their traffic only secure highly attested paths may demand the use of only those optical links with a good, or green status. In either case, note further that a fair or poor status does not necessarily imply that the affected optical link is unusable in an absolute sense, but that such a status may impact routing under the various SLAs and user demands.

In the illustration of FIG. 6, considering the case where the optical link statuses are associated with attestation/security statuses, then signature and path analysis module 114 may determine that, based upon the fact that optical links A-C, A-E, B-D, C-D, and D-F have green statuses, the only fully attested route from node 120 to node 170 is via link A-C to link C-D to link D-F, and that the only fully attested route from node 120 to node 130 is via A-C to link C-D to B-D (assuming that the statuses are bi-directional statuses). Where the illustration of FIG. 6 illustrates a graphical interface, other types of status may be selected. For example, for performance-based routes, the optical link statuses for performance and latency may be shown instead of the attestation status.

In a particular embodiment, network controller 110 operates to manage the paths for various data flows to traverse all-photonics network 100 based upon the SLAs associated with the data flows. In particular, network controller 110 operates to receive a particular data flow that is to be transmitted from a source node to a destination node in accordance with an associated SLA. Utilizing the various optical link status information included in fingerprint database 112, network controller 110 determines a network routing path for the data flow that optimally traverses the optical links that satisfy the particular SLA. Then, network controller 110 directs SDN controller 116 to instantiate the routing behavior of nodes 120, 130, 140, 150, 160, and 170 to implement the selected path for the network flow. Further, network controller 110 operates to monitor the selected optical links in fingerprint database 112 during the transmission of the particular data flow to ensure that none of the selected optical links on the path have experienced a change in their associated status.

If a particular optical link in the path experiences a status change that adversely affects the data flow under the SLA, then network controller 110 operates to determine a new network routing path that satisfies the SLA. In addition to monitoring the statuses for the optical links in the network routing path, network controller 110 further monitors the start-to-finish latency of the data flow from the source to the destination, and compares the latency with the expected latency based upon the latency information in fingerprint database 112. A start-to-finish latency that varies significantly from the expected latency may be an indication of heavy network traffic on one or more of the optical links in the network routing path, or of malicious tampering with the data flow at a software level in one or more of the selected nodes. Network controller 110 similarly operates to determine a new network routing path that satisfies the SLA, and to provide an indication that there is potential malicious activity on the affected node.

Similarly, network controller 110 further monitors the data content parameters of the data flow from the source to the destination. Any change in the parameters of the data received that differs from the parameters of the data transmitted may be further evidence of malicious tampering with the data flow, and network controller 110 again operates to determine a new network routing path that satisfies the SLA, and to provide an indication that there is potential malicious activity on the affected node. Finally, when the data flow is successfully transmitted from the source to the destination, network controller 110 operates to issue an acknowledgement to the source provider of the data flow, attesting to the secure transmission of the data flow.

FIG. 7 may be further understood to represent a graphical display of the selected paths in all-photonics network 100, where the link status of each path is shown in an associated status color or graphical representation. Where such a graphical display is provided on an information handling system, the graphical display may include clickable or automation-controlled links for each path, such that a user may select a particular path, and the graphical display may zoom in on the selected path to show details of the indicated status, such as whether the status is related to the age-related deterioration status, the reliability status, the latency status, or the security attestation status. The graphical display may further permit the selection of the status history for each path, including selectively viewing one or more of the fingerprints, including the mean and the standard deviation where the fingerprint is provided as such, the current reflectometry test cycle results, the most recent excursions from the fingerprint, and the like.

Figure 8:
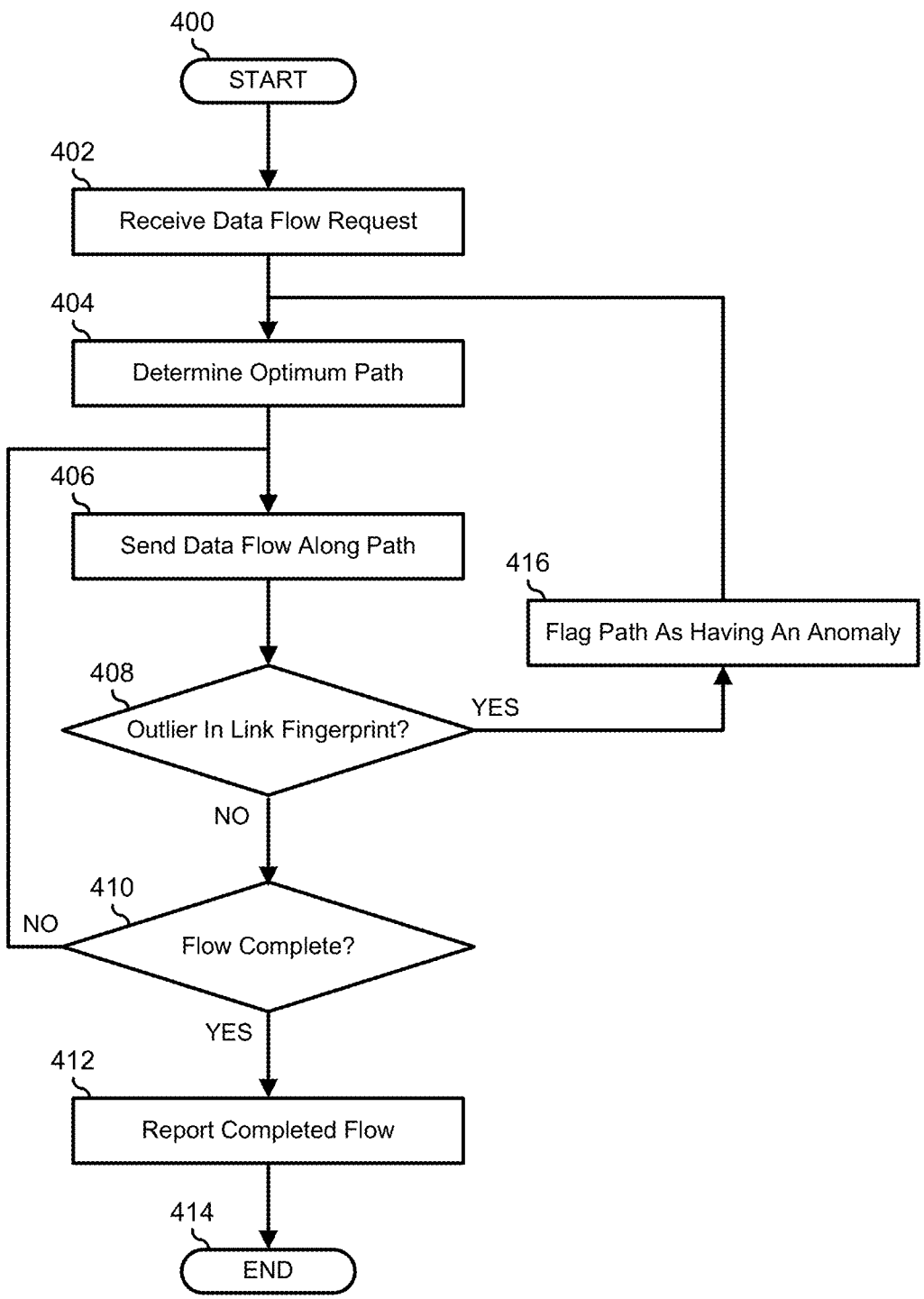
FIG. 8 is a flow chart illustrating a method for managing optimal paths in an all-photonics network.

FIG. 8 illustrates a method for managing optimal paths in an all-photonics network, starting at block 400. A data flow with an associated SLA is received by a network controller in block 402, and the network controller determines an optimum path based upon the status of the optical links in the all-photonics network and the parameters of the SLA in block 404. The network controller directs a SDN controller to configure the all-photonics network to instantiate the optimum path for the data flow, and sends the data flow into the path in block 406. The network controller monitors the status of the optical links along the optimum path and a decision is made as to whether or not there are any anomalies or outliers in any of the optical links in the path in decision block 408. If not, the "NO" branch of decision block 408 is taken and a decision is made as to whether or not the data flow is completed in decision block 410.

If so, the network controller reports that the data flow has been successfully completed in block 312 and the method ends in block 414. If the data flow is not completed, the "NO" branch of decision block 410 is taken and the method returns to block 406 where the network controller continues to send the data flow into the path. Returning to decision block 408, if there are any anomalies or outliers in any of the optical links in the path, the "YES" branch is taken, the path is flagged as having an anomaly in block 416, and the method returns to block 404 where the network controller determines a new optimum path.

Figure 9:
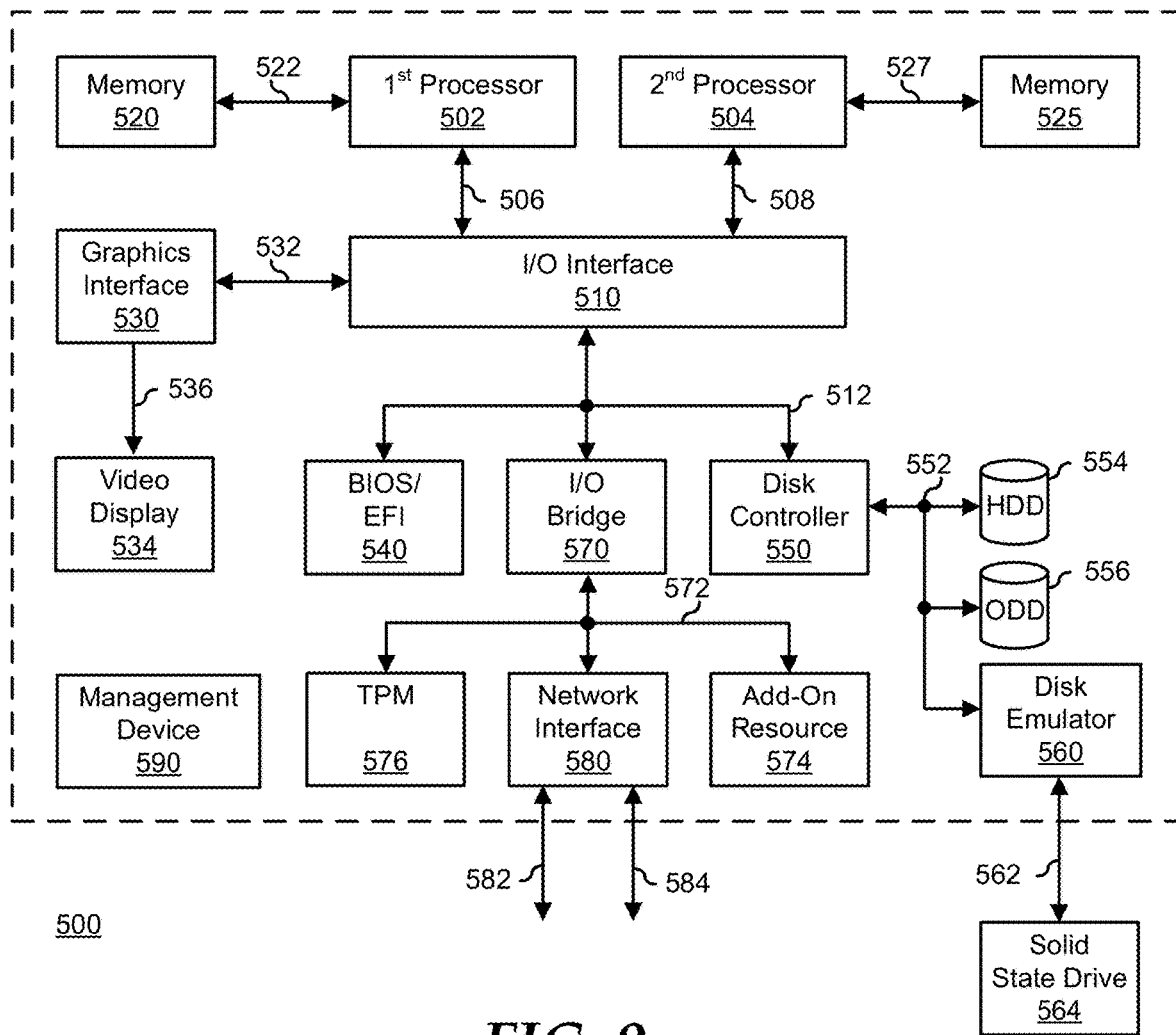
FIG. 9 is a block diagram illustrating a generalized information handling system according to another embodiment of the current disclosure.

FIG. 9 illustrates a generalized embodiment of an information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 564, an I/O bridge 570, one or more add-on resources 574, a trusted platform module (TPM) 576, a network interface 580, and a management device 590. Processors 502 and 504, I/O interface 510, memories 520 and 525, graphics interface 530, BIOS/UEFI module 540, disk controller 550, HDD 554, ODD 556, disk emulator 560, SSD 564, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 536 to a video display 534. In a particular embodiment, information handling system 500 includes separate memories that are dedicated to each of processors 502 and 504 via separate memory interfaces. An example of memories 520 and 525 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a plurality of network nodes, each network node including an optical link and a reflectometry analyzer configured to provide reflectometry results, each reflectometry result providing a characterization of physical properties of the optical link at the time of the reflectometry result; and
   a processor configured to:
   receive the reflectometry results from the reflectometry analyzers;
   for each optical link, analyze the reflectometry results to determine a fingerprint of the physical properties of the associated optical link;
   determine a status for each of the optical links based upon the associated fingerprints, wherein the status for each of the optical links includes an age-related status for the associated optical link, the age-related status being determined based upon a drift over time in a mean value of the associated reflectometry result; and
   display a map of the information handling system including each network node and the associated optical link, wherein the map provides an indication of the status for each of the optical links.

2. The information handling system of claim 1, wherein the fingerprints of the physical properties of each of the optical links includes the mean value of the associated reflectometry results.

3. The information handling system of claim 2, wherein the fingerprints of the physical properties of each of the optical links further includes a standard deviation from the mean value of the associated reflectometry results.

4. The information handling system of claim 3, wherein the status for each of the optical links includes an anomaly-related status for the associated optical link.

5. The information handling system of claim 4, wherein the anomaly-related status for each optical link is determined based upon an excursion from the standard deviation for the associated optical link.

6. The information handling system of claim 5, wherein the anomaly-related status for each optical link includes a location along a length of the associated optical link where the excursion is experienced.

7. The information handling system of claim 3, wherein the status for each of the optical links includes a latency-related status for the associated optical link.

8. The information handling system of claim 7, wherein the latency-related status for each optical link is determined based upon a test cycle time for the reflectometry results for the associated optical link.

9. The information handling system of claim 1, wherein the indication of the status for each of the optical links includes one of the fingerprint, an excursion from the fingerprint, and a current reflectometry result.

10. A method for analyzing an information handling system, the method comprising:
    providing, in each network node of a plurality of network nodes of the information handling system, an optical link and a reflectometry analyzer configured to provide reflectometry results, each reflectometry result providing a characterization of physical properties of the optical link at the time of the reflectometry result;
    for each optical link analyzing, by a processor of the information handling system, the reflectometry results to determine a fingerprint of the physical properties of the associated optical link;
    determining a status for each of the optical links based upon the associated fingerprints, wherein the status for each of the optical links includes an age-related status for the associated optical link, the age-related status being determined based upon a drift over time in a mean value of the associated reflectometry result; and
    displaying a map of the information handling system including each network node and the associated optical link, wherein the map provides an indication of the status for each of the optical links.

11. The method of claim 10, wherein the fingerprints of the physical properties of each of the optical links includes the mean value of the associated reflectometry results, and a standard deviation from the mean value of the associated reflectometry results.

12. The method of claim 11, wherein the status for each of the optical links includes an anomaly-related status for the associated optical link.

13. The method of claim 12, wherein the anomaly-related status for each optical link is determined based upon an excursion from the standard deviation for the associated optical link.

14. The method of claim 13, wherein the anomaly-related status for each optical link includes a location along a length of the associated optical link where the excursion is experienced.

15. The method of claim 11, wherein the status for each of the optical links includes a latency-related status for the associated optical link.

16. The method of claim 15, wherein the latency-related status for each optical link is determined based upon a test cycle time for the reflectometry results for the associated optical link.

17. The method of claim 10, wherein the indication of the status for each of the optical links includes one of the fingerprint, an excursion from the fingerprint, and a current reflectometry result.

18. An information handling system, comprising:
a plurality of network nodes, each network node including an optical link and a reflectometry analyzer configured to provide reflectometry results, each reflectometry result providing a characterization of physical properties of the optical link at the time of the reflectometry result;
a processor configured to:
for each optical link, analyze the reflectometry results to determine a fingerprint of the physical properties of the associated optical link; and
determine a status for each of the optical links based upon the associated fingerprints, wherein the status for each of the optical links includes an age-related status for the associated optical link, the age-related status being determined based upon a drift over time in a mean value of the associated reflectometry result; and
a display device configured to display a map of the information handling system including each network node and the associated optical link, wherein the map provides an indication of the status for each of the optical links.

19. The information handling system of claim 18, wherein the indication of the status for each of the optical links includes one of the fingerprint, an excursion from the fingerprint, and a current reflectometry result.

\* \* \* \* \*